April 11, 1961 A. M. MOEN 2,978,917
HANDLE AND VALVE STEM CONNECTION FOR MIXING FAUCET
Filed Oct. 1, 1956 2 Sheets-Sheet 1
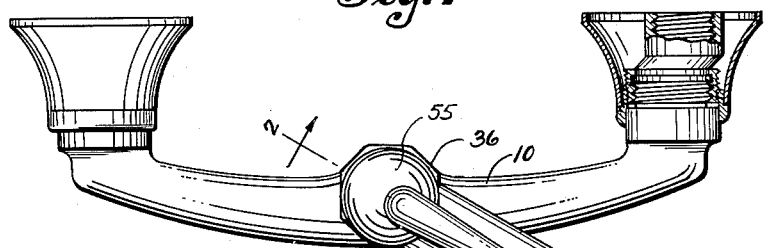
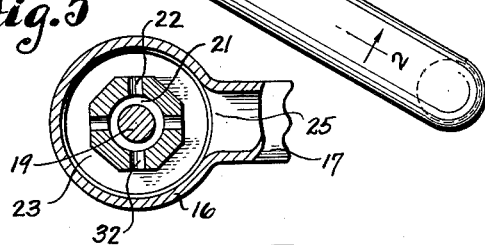
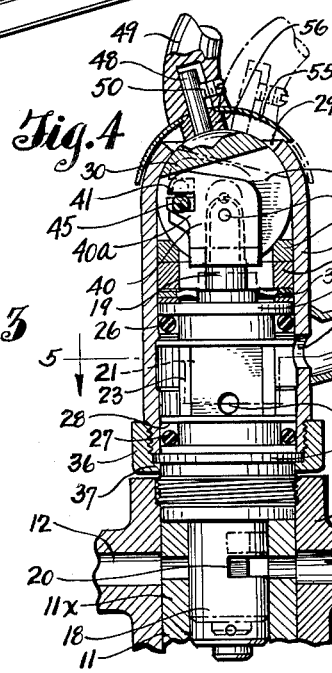
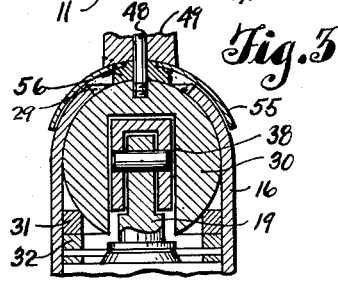
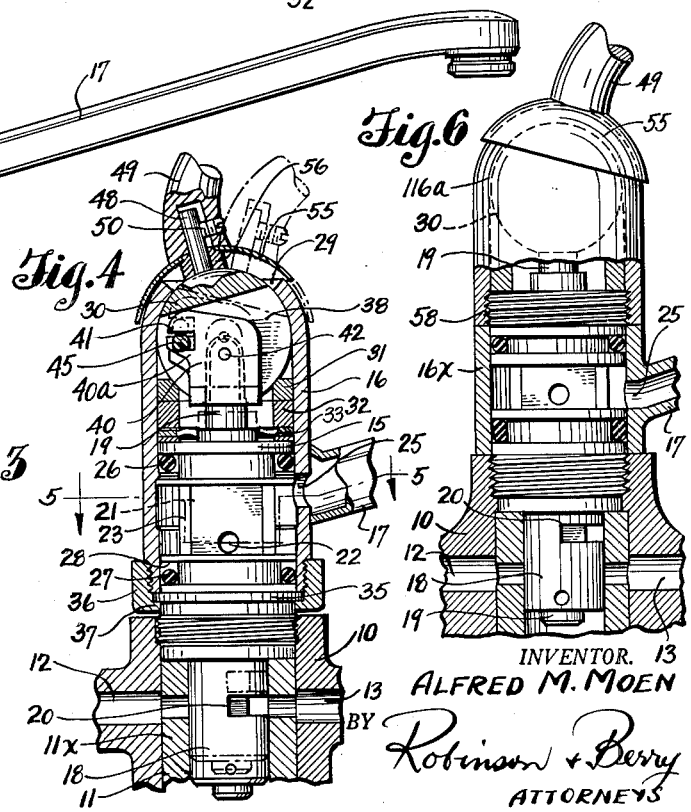
INVENTOR.
ALFRED M. MOEN
BY Robinson + Berry
ATTORNEYS

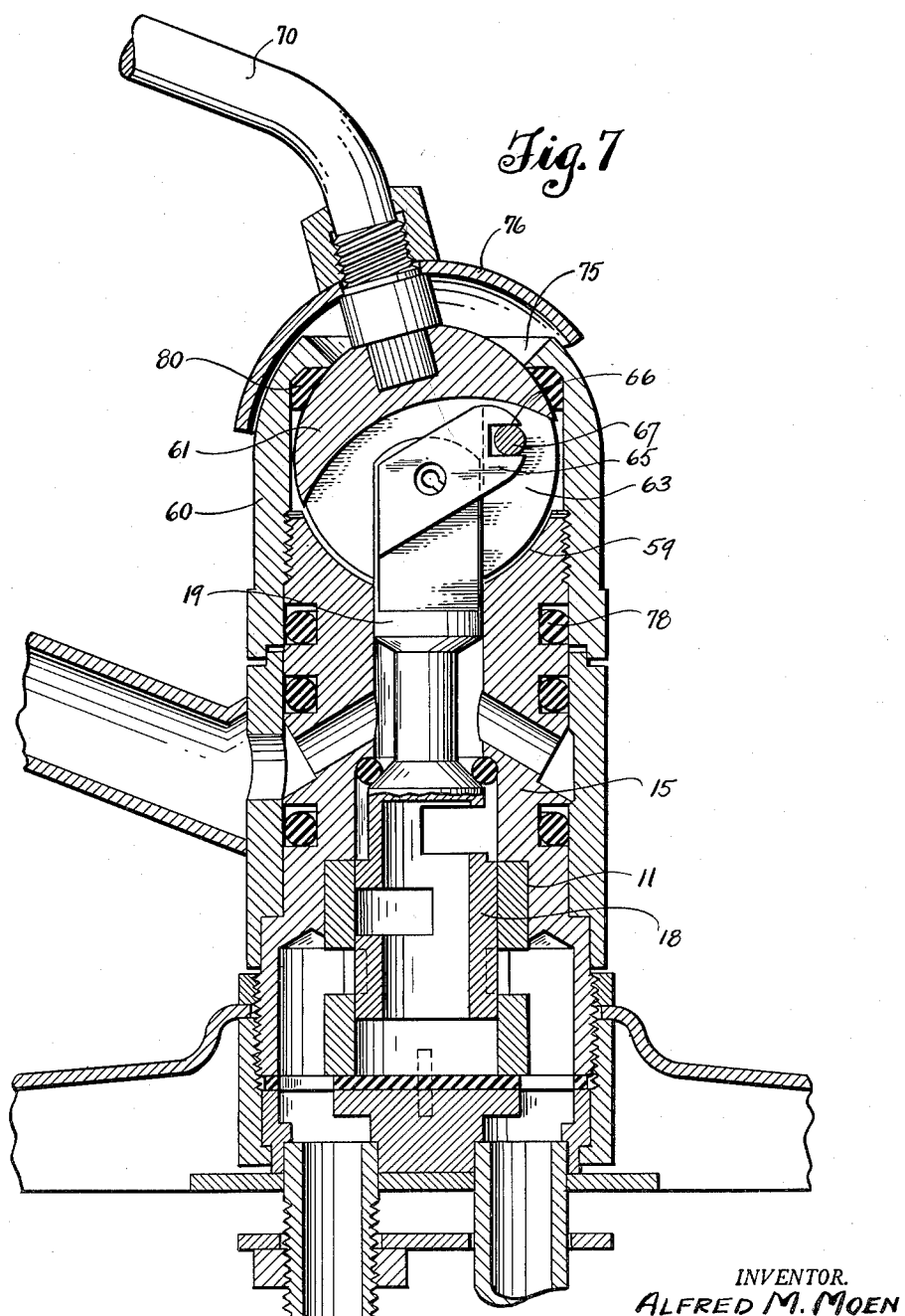

United States Patent Office 2,978,917
Patented Apr. 11, 1961

2,978,917
HANDLE AND VALVE STEM CONNECTION
FOR MIXING FAUCET
Alfred M. Moen, 377 Woodland Ave., Elyria, Ohio
Filed Oct. 1, 1956, Ser. No. 613,032
2 Claims. (Cl. 74—104)

This invention relates to faucets, or the like, wherein a valve means is rotatably and longitudinally movable to determine mixture and flow of the controlled fluid medium or mediums. More particularly, the present invention relates to improvements in water faucets of those types known in industry as "mixing faucets" and wherein a single valve is rotatably adjustable to establish a flow that may be either all cold water, all hot water or proportionate amounts ranging between all cold and all hot water, and which valve is longitudinally adjustable to regulate the flow.

It is the principal object of this invention to provide novel improvements in the valve controlling and adjusting means employed in such faucets; that will be easily operable both for rotary and longitudinal adjustment of the valve; that will retain the valve against movement by water pressure from any position at which it is adjusted, and which improvements are practical, useful and enhance the appearance of the faucet.

It is also an object of the present invention to provide a valve adjusting or regulating means of the above stated character that is characterized by the use of a spherical bearing member, mounted for universal rotation in a housing, under control of a single handle and about a center that is in the axial line of the valve controlling stem, and wherein the valve stem is extended into the bearing and has a novel connection therewith whereby, through manipulations of the handle, the valve can be adjusted both rotatably and longitudinally.

Still further objects and advantages of the invention reside in the details of construction and combination of parts comprised by or related to the valve operating means, as will hereinafter be fully described.

In accomplishing the above mentioned and other objects of the invention, I have provided the improved details of construction, the preferred forms of which are illustrated in the accompanying drawings wherein:

Fig. 1 is a top or plan view of a mixing faucet equipped with valve controlling means embodied by the present invention.

Fig. 2 is a vertical, sectional view of the same, taken on the line 2—2 in Fig. 1, showing the valve in closed position.

Fig. 3 is a somewhat enlarged sectional view, taken through the handle mounting bearing on the line 3—3 in Fig. 2.

Fig. 4 is an axial section taken through the plug and bearing containing housing of the faucet, showing the valve in open position.

Fig. 5 is a horizontal section taken on line 5—5 in Fig. 4.

Fig. 6 is a partial sectional view of a faucet showing a modified form of plug and swing spout mounting.

Fig. 7 is a sectional view showing yet another form of handle mounting for the present type of faucet.

Referring more in detail to the drawings:

In Figs. 2 and 4, I have shown the present faucet as comprising a valve housing 10 formed with a vertical valve chamber 11 and having hot and cold water inlets 12 and 13 opening into opposite sides of the chamber at the same level between its upper and lower ends.

Threaded into the upper end of the valve chamber 11 is the lower end portion of the valve stem mounting member 15, herein referred to as the "plug."

Fitted closely about the plug, for rotation thereon is a substantially cylindrical housing 16 which has a water discharge spout 17 extending upwardly and laterally therefrom. This mounting provides that the spout can be swung from side to side. Outflow of water from the faucet is under control of a valve member 18 which is fitted for rotation and longitudinal adjustment in a hardened metal sleeve 11x that is press fitted into the valve chamber 11. The valve 18 is tubular and is fixed to the lower end of a valve stem 19 that extends axially through the plug 15 and into the tubular valve with clearance between them for an upflow of water entering the valve. The valve is formed in a sidewall thereof with an inlet channel 20 which, by longitudinal movement of the valve, can be caused to move from and into registration with one or both water inlets 12 and 13, to more or less extent to control volume, and by a rotary adjustment when in any open position, the proportionate amounts of hot and cold water can be varied. Water that enters the valve 18 through the sidewall passage 20 is discharged from its upper end into a passage 21 leading upwardly into the plug, and then out through plug ports, as at 22, into an annular chamber 23 that is formed about the plug and covered by the enclosing housing 16. A discharge port 25 in the housing wall opens into the spout. Above and below the annular chamber 23, O-ring sealing gaskets 26 and 27 are fitted in channels 28 in the plug to prevent leakage.

Further detailed description of the valve structure for control of water flow will not be given herein as per se it forms no particular part of the present invention. It is to be understood, however, that the valve means employed, and its mode of operation is like or substantially like that of my prior patent issued on August 7, 1956 under No. 2,757,687.

The novel features of the present invention reside in the means for mounting the valve adjusting handle and the means effecting its operating connection with the valve stem for rotary and longitudinal movements of the valve. This will now be described, more particularly in reference to the showing in Figs. 2, 3 and 4, wherein it is seen that the upper end portion of the housing 16 is closed by a spherically rounded end wall formed with a central opening 29. Contained in the upper end portion of the housing 16, and fitted for rotation against the spherically curved end wall is a bearing 30 of spherical form. This bearing rests upon an annular and spherically shaped seat provided by a ring 31 that is fitted in the housing 16 above the upper end of the plug 15. Ring 31 rests against a ring 32 of like diameter and this is supported, through wave washer 33 from the upper end surface of the plug. These bearing supporting rings are accurately adjusted in position in order that the bearing 30 will have a free turning action, but without any looseness. The housing 16 is held in proper position relative to the plug 15 which it encloses by reason of its resting at its lower end against an annular flange 35 formed on the plug, and against which it is clamped by a ring 36 that is threaded onto the lower end portion of the housing, and which has an inturned flange 37 that underlaps the annular flange 35 of the plug as well shown in Fig. 4.

The spherical bearing 30 is formed, diametrically therethrough, with a deep cut and downwardly opening channel 38 into which the upper end of the valve stem 19 extends. Fixed on the upper end of the stem and contained in the channel 38 is a cap or head 40 formed with a laterally directed arm 40a having a laterally opening pocket 41 at its end. This cap 40 is fixed to the upper end of the stem by a pin 42, and the stem is held against axial rotation in the channel or relative to the bearing by reason of the shape of the cap. Extended horizontally through the bearing, eccentrically thereof and offset from the axial line of the stem 19 to a substantial distance, and passing also through the channel 38 of the bearing is a pivot pin 45. This pin passes horizontally through the pocket 41 of the arm 40a without clearance or looseness in the vertical direction but with freedom of movement in a horizontal direction.

Fixed in the top side of the spherical bearing 30 is a radially directed stud 48 on which a lever arm 49, or handle, is fixed by a set screw 50. The handle, as noted in Fig. 2 is formed with a lateral bend whereby it is directed forwardly; this being for a neutral, closed position of the valve.

It will be understood, particularly by reference to Figs. 2 and 4, that by an upward swinging movement of the handle, the bearing 30 will be rotated in such manner that the pivot pin 45 pushes the stem 19 downwardly thus to move valve 18 from closed toward an open position. Likewise, if the handle is pushed downwardly, the bearing is so rotated that the valve will be lifted toward its closed position.

The handle is so fixed to the bearing that when directed forwardly the valve will be set at a neutral position. By swinging the handle to the left to its limit, the valve will be rotated to position it when opened, for reception of all hot water. The volume of flow is regulated by the up and down adjustment of the handle. Likewise, by swinging the handle to the right to its limit, the valve will be positioned for all cold water when opened. By movement of the handle to positions intermediate its limits, the proportionate amounts of water discharged from the open valve will be varied accordingly.

To give the faucet a more attractive appearance, a spherically curved cap 55 is applied about the stud 48 and clamped in fixed position between an underlying spacer block 56 and the lower end of the handle. This cap conforms to the curvature of the upper end of housing 16 and covers the opening 29 in all positions of adjustment of the handle.

The faucet of Fig. 6 is substantially like that of Fig. 4 in so far as its principle and mode of operation is concerned. However, in this showing, a tubular housing 16x encloses and is rotatable on the lower portion of the plug immediately above the threaded connection of the plug with the valve housing 10, and this is equipped with the swing spout 17. Above the housing 16x, a shortened housing 116a, or bonnet, is threaded onto the upper end portion of the plug, as at 58 and this encloses a spherical handle mounting bearing 30 in the same way as described in connection with the disclosures of Fig. 4. The manner of connecting the valve stem 19 with the bearing 30 and manner of attaching the handle to the bearing is not shown in detail in this view but could be like that shown in Fig. 4, or as in the showing in Fig. 7 which will now be described.

In the faucet of Fig. 7, the part designated in Figs. 2 and 4 as the housing 10 is not employed and the plug portion, or faucet body 15 embodies the valve chamber 11 therein, and also mounts the handle and swing spout substantially as in the faucet of Fig. 6. A valve member 18 controls the water mixture and its flow in the same manner as previously described in connection with the faucets of Figs. 4 and 6, and the valve is rotatably and longitudinally adjusted by means of a valve stem 19 which extends upwardly through and from the upper end of the body 15.

Since the detailed structure of the valve and lower part of the body 15 as seen in Fig. 7, forms no part of the present invention, it will not be further described, but the means effecting connection of stem and handle as embodied by this invention and will now be described.

The body 15 is axially bored as in the previously described structures, for passage of the valve stem 19. At its upper end the bore opens centrally into a spherical socket or depression 59 formed in the upper end surface of the body. Threaded onto the upper end of the body is a hollow bonnet 60, in the upper end of which a ball shaped bearing 61 is confined. This bearing is fitted to the spherical socket 59 for easy rotation and is formed across its underside with a diametric channel 63 in which the upper end of the valve stem 19 is contained. The upper end of the valve stem is equipped with a laterally directed arm 65 which is formed at its end with a laterally opening notch 66. A pivot pin 67 extends through the bearing 61 eccentrically thereof, and through the arm notch 66, thus providing an operating connection between the bearing and valve stem.

A valve operating handle 70 is fixed at its inner end, in the ball bearing and extends upwardly from the enclosing bonnet and then angularly therefrom. By means of this handle the bearing can be rotated toward either side by lateral swinging of the handle 70, thus to rotate the stem 19 and valve 18 accordingly, to regulate water mixture. Also, by an up and down movement of the handle, the ball can be rotated to effect an up and down movement of the stem to open and close the valve.

Swinging movement of the handle is permitted by reason of the upper end of the bonnet being formed with a relatively large opening 75 through which the handle extends with clearance as shown. This opening is covered by a spherically curved plate 76 that is applied to the handle closely overlying the top end of the bonnet.

A feature of this construction resides in the application of a sealing gasket 78 of O-ring form, set within an annular channel 79 in the body 15, to seal the joint between body and lower end of the bonnet. Also, a sealing gasket 80 is applied about the upper end wall opening 75 between the bonnet wall and ball bearing. Should leakage of water along stem 19 occur, it is retained by these gaskets.

What I claim as new is:

1. An actuator comprising a housing, a mounting plug joined to and extending from said housing, a stem mounted in said plug for rotational and longitudinal movement, the outer end of the stem extending from and above said plug, a plug housing surrounding said plug and enclosing the outer end portion of the stem, a spherical, ball-like bearing contained in and engageable with said plug housing above the plug, a diametrically directed slot in said bearing into which the outer end portion of stem extends, an arm fixed to the stem and contained in said slot and projecting radially from the stem, means at the outer end of said arm pivotably connecting the arm to said bearing at a point radially spaced from the axis of the stem, a semi-spherical seat on the upper end of said plug on which said bearing is adapted to seat, a bearing retaining outer end portion within said plug housing engageable by said bearing, a handle means secured to and extending from said bearing for effecting adjustment thereof and a closure cap secured to said stem spaced from the upper end of said plug housing.

2. An actuator as in claim 1 including sealing means within said plug housing adjacent the upper end thereof, said sealing means being in sealing engagement with the surface of the bearing adjacent thereto.

References Cited in the file of this patent

UNITED STATES PATENTS

| | | |
|---|---|---|
| 615,939 | Wilson | Dec. 13, 1898 |
| 2,017,317 | Magney | Oct. 15, 1935 |
| 2,373,702 | Moen | Apr. 17, 1945 |
| 2,497,557 | Reeves | Feb. 14, 1950 |
| 2,539,120 | Courtot | Jan. 23, 1951 |
| 2,607,600 | Trautman | Aug. 19, 1952 |
| 2,609,206 | Moen | Sept. 2, 1952 |
| 2,657,860 | Schmidt | Nov. 3, 1953 |
| 2,757,687 | Moen | Aug. 7, 1956 |
| 2,847,027 | Kumpman | Aug. 12, 1958 |
| 2,878,331 | Fjellstedt | Mar. 17, 1959 |